United States Patent Office 2,954,316
Patented Sept. 27, 1960

2,954,316

VINYL PHOSPHATE PESTICIDES

Everett E. Gilbert, Morris Township, Morris County, Julian A. Otto, Lake Tamarack, and Edmund J. Rumanowski, Jersey City, N.J., assignors to Allied Chemical Corporation, New York, N.Y., a corporation of New York No Drawing. Filed Dec. 18, 1958, Ser. No. 781,197

15 Claims. (Cl. 167—22)

This invention relates to the production of new vinyl phosphate compounds useful as active pesticidal toxicants.

Accordingly, one object of the invention is to provide new chemical compounds in the form of vinyl phosphates. Another object is to provide a process for the production of the new vinyl phosphate compounds. Still another object is the provision of novel vinyl phosphate compounds for application as pesticides. Other objects and advantages will be apparent hereinafter.

The novel vinyl phosphate compounds of this invention conform to the following general formulas:

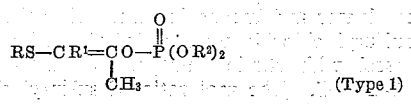

(Type 1)

and

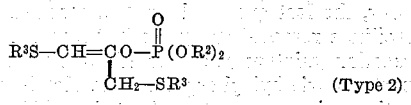

(Type 2)

in which R is a member of the group consisting of alkyl and monochloroalkyl radicals, preferably lower alkyl and monochloroalkyl radicals, for example, those containing from one to four carbon atoms, $R^1$ is a member of the group consisting of hydrogen and chlorine, and $R^2$ and $R^3$ are alkyl radicals, preferably lower alkyl radicals, for example, those containing from one to four carbon atoms. In the "Type 2" compounds, each $R^3$ represents the same alkyl radical, which may or may not be the same as the alkyl radical represented by $R^2$.

The vinyl phosphate compounds designated as "Type 1" are prepared by reacting an alkylmercaptoacetone with a suitable chlorinating agent, such as sulfuryl chloride, to form a chlorinated alkylmercaptoacetone, which is then reacted with a trialkyl phosphite to produce the desired vinyl phosphate compound. The equations representing these reactions are as follows:

(1)
$$R^3S-CH_2-CO-CH_3+(X)SO_2Cl_2 \longrightarrow$$
$$RS-CR^1Cl-CO-CH_3+(X)SO_2+X(HCl)$$

(2)
$$RS-CR^1Cl-CO-CH_3+(OR^2)_3P \longrightarrow$$

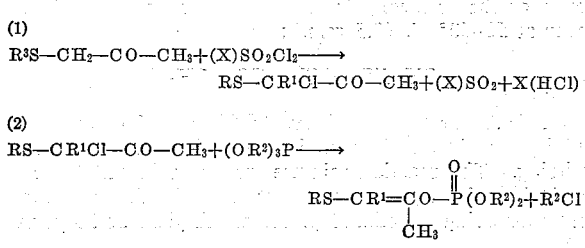

In the above equations, R is a member of the group consisting of alkyl and monochloroalkyl radicals, $R^1$ is a member of the group consisting of hydrogen and chlorine, and $R^2$ and $R^3$ are alkyl radicals. Further, X represents the degree of chlorination of alkylmercaptoacetone. X may vary from 1 to 3 and, hence, includes monochlorination, dichlorination and trichlorination reactions. Thus, when the mercaptoacetone compound is dichlorinated, $R^1$ becomes chlorine. When the mercaptoacetone compound is trichlorinated, $R^1$ becomes chlorine and R becomes monochloroalkyl.

The alkylmercaptoacetone employed in the chlorination reaction may be readily prepared by reacting monochloroacetone with an alkyl mercaptan, e.g., methyl, ethyl, propyl or butyl mercaptan, in the presence of a base. This reaction may be represented by the following equation, in which $R^3$ is an alkyl radical:

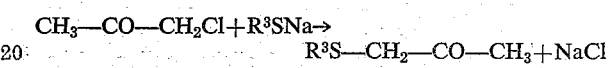

The vinyl phosphate compounds designated as "Type 2" are prepared by reacting a 1,3-di(alkylmercapto) acetone with a suitable chlorinating agent, such as sulfuryl chloride, to form the corresponding monochloro compound, which is then reacted with a trialkyl phosphite to produce the desired vinyl phosphate compound. The equations representing these reactions are as follows:

(1)
$$R^3S-CH_2-CO-CH_2-SR^3+SO_2Cl_2 \longrightarrow$$
$$R^3S-CHCl-CO-CH_2-SR^3+SO_2+HCl$$

(2)
$$R^3S-CHCl-CO-CH_2-SR^3+(OR^2)_3P \longrightarrow$$

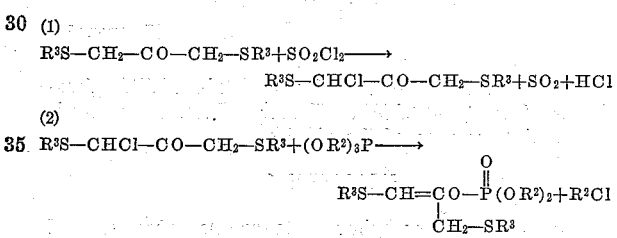

In the above equations, $R^2$ and $R^3$ represent alkyl radicals.

The 1,3-di(alkylmercapto) acetone may be prepared by reacting 1,3-dichloroacetone with an alkyl mercaptan in the presence of a base. This reaction may be represented by the following equation, in which $R^3$ is an alkyl radical:

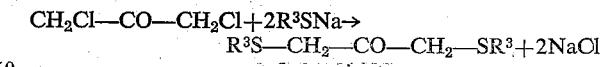

The chlorination reactions are carried out by adding any suitable chlorinating agent, such as sulfuryl chloride or chlorine, with stirring and cooling to maintain the reaction temperature at about 10 to 20° C. After addition of the chlorinating agent, the reaction mixture is then held for about 1 to 2 hours at a temperature of about 80 to 90° C. Hydrogen chloride by-product formed during the reaction may be removed by any procedure known to those skilled in the art, preferably by placing the reaction mixture under reduced pressure.

A trialkyl phosphite, e.g., trimethyl, triethyl, tripropyl or tributyl phosphite, is added to the reaction mixture containing chlorinated mercaptoacetone compound with stirring and cooling to maintain the reaction temperature at about 40 to 65° C. If desired, the chlorinated mercaptoacetone compound may be isolated prior to reaction with phosphite, as by distillation at reduced pressure. After addition of the phosphite, the reaction mixture is held for about 1 to 2 hours at a temperature of about 80 to 100° C. Alkyl chloride by-product formed during the reaction may be removed by any procedure known to those skilled in the art, preferably by placing the reaction mixture under reduced pressure.

Although the chlorinated mercaptoacetone compound and phosphite may be charged in molar proportions of 1 mol of mercaptoacetone compound to about 1.0 to 1.2 mols of phosphite, approximately equimolar proportions of the reactants are preferred.

The following examples are given for the purpose of illustrating the present invention but are not intended to be limiting on the scope thereof. In the examples, parts are by weight.

EXAMPLE 1

10.4 parts of methylmercaptoacetone were placed in a reaction vessel provided with a mechanical stirrer, reflux condenser and means for external cooling. 13.5 parts of sulfuryl chloride were added dropwise to the reaction vessel with stirring and cooling at a temperature of 10–20° C. After addition of the sulfuryl chloride, the reaction mixture was heated to 85°±5° C. and held there for about 2 hours, the last half hour being at reduced pressure to facilitate removal of by-product hydrogen chloride. The reaction mixture was cooled to about 45° C., and 16.6 parts of triethyl phosphite were added dropwise with stirring and slight cooling. The reaction mixture was then heated to 85°±5° C. and held there for about 2 hours, the last half hour being at reduced pressure to facilitate removal of by-product ethyl chloride. A yield of 23 parts of a brown oil constituting the following vinyl phosphate compound was obtained:

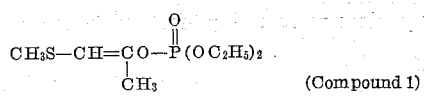
(Compound 1)

This compound was found to contain 12.7% phosphorus (theory—12.9%). Further, infrared analysis showed the presence of the vinyl group.

EXAMPLE 2

10.4 parts of methylmercaptoacetone were reacted with 13.5 parts of sulfuryl chloride and then with 12.4 parts of trimethyl phosphite using the procedure described in Example 1. 21 parts of a brown oil constituting the following vinyl phosphate compound were obtained:

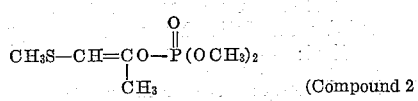
(Compound 2)

EXAMPLE 3

11.8 parts of ethylmercaptoacetone were reacted with 13.5 parts of sulfuryl chloride and then with 16.6 parts of triethyl phosphite using the procedure described in Example 1. 25 parts of a brown oil constituting the following vinyl phosphate compound were obtained:

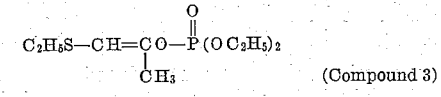
(Compound 3)

EXAMPLE 4

11.8 parts of ethylmercaptoacetone were reacted with 13.5 parts of sulfuryl chloride and then with 12.4 parts of trimethyl phosphite using the procedure described in Example 1. 22 parts of a brown oil constituting the following vinyl phosphate compound were obtained:

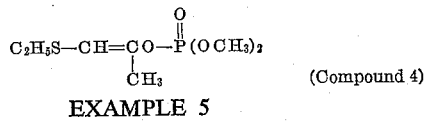
(Compound 4)

EXAMPLE 5

15 parts of 1,3-di(methylmercapto) acetone were reacted with 13.5 parts of sulfuryl chloride and then with 16.6 parts of triethyl phosphite using the procedure described in Example 1. 27 parts of a brown oil constituting the following vinyl phosphate compound were obtained:

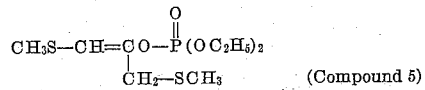
(Compound 5)

This compound was found to contain 11.1% phosphorus (theory—10.8%). Further, infrared analysis showed the presence of the vinyl group.

EXAMPLE 6

12.5 parts of 1,3-di(ethylmercapto) acetone were reacted with 9.4 parts of sulfuryl chloride and then with 8.7 parts of trimethyl phosphite using the procedure described in Example 1. 18 parts of a brown oil constituting the following vinyl phosphate compound were obtained:

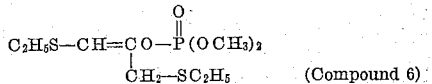
(Compound 6)

EXAMPLE 7

11.8 parts of ethylmercaptoacetone were placed in a reaction vessel provided with a mechanical stirrer, reflux condenser and means for external cooling. 27 parts of sulfuryl chloride were added dropwise to the reaction vessel with stirring and cooling at a temperature of 10–20° C. The mol ratio of sulfuryl chloride to mercaptoacetone compound was about 2:1. After addition of the sulfuryl chloride, the reaction mixture was heated to about 85°±5° C. and held there for about one hour, the last quarter hour being at reduced pressure to facilitate removal of by-product hydrogen chloride. The reaction mixture was cooled to 60°±5° C., and 16.6 parts of triethyl phosphite were slowly added. The reaction mixture was then heated to 85°±5° C. and held there for one hour, the last quarter hour being at reduced pressure to facilitate removal of by-product ethyl chloride. A yield of 28 parts of a brown oil constituting the following vinyl phosphate compound was obtained:

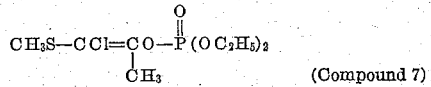
(Compound 7)

EXAMPLE 8

41.6 parts of methylmercaptoacetone were placed in a reaction vessel provided with a mechanical stirrer, reflux condenser and means for external cooling. 162 parts of sulfuryl chloride were slowly added to the reaction vessel with stirring and cooling at a temperature of 10–20° C. The reaction mixture was warmed to 90°±5° C. and held there for about one hour, reduced pressure being applied during the last five minutes. 78 parts of the following trichlorinated compound distilled over at 50–60° C. (0.5 mm.):

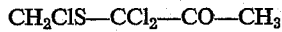

To 20.8 parts of the above trichlorinated compound, 16.6 parts of triethyl phosphite were added dropwise with stirring. The reaction mixture was then heated to 85° ±5° C. and held there for about one hour, the last quarter hour being at reduced pressure. A yield of 30 parts of an oil constituting the following vinyl phosphate compound was obtained:

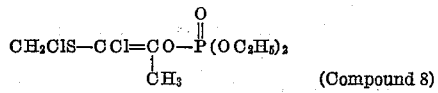
(Compound 8)

EXAMPLE 9

To 20.8 parts of the trichlorinated compound prepared as in Example 8, 12.4 parts of trimethyl phosphite were added dropwise to the reaction mixture with stirring. The reaction mixture was heated to 85° ±5° C. and held there for about one hour, the last quarter hour being at reduced pressure. A yield of 28 parts of an oil constituting the following vinyl phosphate compound was obtained:

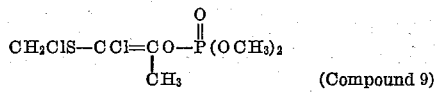
(Compound 9)

The vinyl phosphate compounds of this invention are ordinarily applied as toxicants for combatting pests, particularly insects and mites, in conjunction with a carrier which may be a solid, liquid or gaseous material, the invention compounds constituting the toxic ingredients of such compositions. The vinyl phosphate compounds may be employed either in the form of aqueous sprays or dust compositions and the amount of toxicant used may vary, a sufficient quantity being used to provide the desired toxicity.

When employed in the form of a powder or dust for killing pests, the vinyl phosphate compounds or toxicants may be mixed with a substantial proportion of any suitable inert material or diluent, preferably in finely divided form, such as known grades of prepared paraciticide carrier clays, pyrophyllite, fuller's earth, bentonite, sulfur, lime, talc, whiting, diatomaceous earth, etc. Suitable dusts of this type usually contain not less than 1% and preferably not less than 3% by weight of toxicant.

Liquid pesticide sprays containing the toxicants of this invention may be prepared by first forming a solution of the compound in a suitable organic solvent, e.g., xylene, methylated naphthalenes or any highly aromatic petroleum-type paraciticide oil, and preferably adding a small amount of emulsifying agent commonly employed in the art, such as diglycol oleate or p-isoctyl phenyl ether or polyethylene glycol. The resulting concentrate solution is incorporated with water in quantity sufficient to form an aqueous dispersion or emulsion having the desired active ingredient concentration.

In a preferred embodiment, aqueous spray dispersions or emulsions may be formed by incorporating in water dry mixtures or so-called wettable spray powders containing the vinyl phosphate compounds of the invention. These mixtures may also include inert diluents, suitable quantities of wetting and dispersing agents and, if desired, secondary toxicants.

The aqueous spray dispersions of the invention preferably should contain the active ingredient in an amount not less than 1/32 of a pound per hundred gallons of spray, the more usual concentrations being in the range of 0.15 to 0.50 of a pound per hundred gallons of spray.

Many of the vinyl phosphate compounds of this invention are not only effective as contact toxicants but are also extremely toxic when used as systemic toxicants for killing pests which invade plants. In such use, the toxicant, with or without a suitable carrier or diluent, can be applied to soil in the vicinity of the growing plant to be protected, the toxicant being absorbed by the plant. Alternatively, the toxicant can be applied directly to portions of the plant where it is again absorbed and distributed throughout the plant tissues, including portions not directly treated. In either case, the whole plant then becomes toxic to pests which feed on it.

Following Table 1 constitutes the result of tests relating to use of a number of typical vinyl phosphate compounds of the invention as contact pesticides:

Table 1

| Vinyl Phosphate Compound | Formulation (parts by volume) | Mites [a] (Percent kill) | Pea Aphids [b] (Percent kill) | Mexican Bean Beetle Larvae [c] (Percent kill) | Houseflies (Percent kill) |
|---|---|---|---|---|---|
| 1 | 1 part vinyl phosphate composition [1] per 79 parts water.* | 100 | 100 | 100 | 100 |
| 2 | do | 100 | 100 | 100 | 100 |
| 3 | do | 100 | 100 | 100 | 100 |
| 4 | do | 100 | 100 | 100 | 100 |
| 5 | do | 100 | 100 | 80 | 98.3 |
| 6 | do | 100 | 100 | 100 | 92.5 |
| 7 | do | 100 | 100 | 100 | 100 |
| 8 | do | 100 | 100 | 100 | 98 |
| 9 | do | 100 | 100 | 100 | 100 |
| 1 | 1 part vinyl phosphate composition [1] per 1,279 parts water. | 100 | | | |
| 2 | do | 100 | | **80 | |
| 3 | do | 100 | | 100 | |
| 4 | do | 100 | | **50 | |
| 5 | do | 100 | | 100 | |
| 6 | do | 100 | | | |
| 7 | do | 100 | | **80 | |
| 8 | do | | | 86.7 | |
| 9 | do | | | 100 | |

[1] 4.8 grams of vinyl phosphate compound dissolved in acetone to 100 cc.
*In test on toxicity to houseflies, 79 parts of a sugar solution (20 pounds of sugar dissolved in water to 100 gallons) were used.
**The insects remaining were also affected.
[a] The mite tests were run on "red spider" (*Tetranychus telarius*) by spraying the indicated formulation onto horticultural (cranberry) bean plants infested with the mites. Following treatment, the plants were stored on racks on irrigated trays in a greenhouse. Observations on kill were made 3 days after treatment.
[b] The tests on toxicity to pea aphids (*Macrosiphum pisi*) were run by removing the pea aphids from infested broad bean plants, placing them on a wire screen and spraying them with the indicated formulation. Following treatment, the pea aphids were confined to untreated broad bean plants. Record of kill was made 3 days after treatment.
[c] The tests on toxicity to Mexican bean beetle larvae (*Epilachna varivestis*) were run by spraying horticultural (cranberry) bean plants with the indicated formulation and allowing the plants to dry. The larvae were confined to the treated foliage by means of wire cages. Record of kill was made 3 days after treatment.
[d] The tests on toxicity to houseflies (*Musca domestica*) were run by spraying the indicated formulation onto glass plates and allowing the plates to dry. The flies were confined over the plates by means of screen wire hemispheres, moisture and food provided in the form of balls of "Cellucotton" (an absorbent cellulose composition resembling cotton) soaked in water-sugar solution. Percentage kill was recorded 24 hours after confinement.

Following Table 2 illustrates systemic pesticide activity of some of the vinyl phosphate compounds coming within the scope of this invention. The tests were run by mixing 20 cc. of the indicated formulation with soil (170 gms. dry weight) in a flowerpot containing horticultural (cranberry) bean plants. One day later the plant foilage was infested with the pest, and kills were noted three days after infestation.

Table 2

| Vinyl Phosphate Compound | Formulation (parts by volume) | Mites (percent kill) | Pea Aphids (percent kill) | Bean Beetle Larvae (percent kill) |
|---|---|---|---|---|
| 1 | 1 part vinyl phosphate composition [1] in 79 parts of water. | 100 | 100 | 100 |
| 2 | do | 100 | 100 | 100 |
| 3 | do | 100 | 100 | 100 |
| 4 | do | 100 | 100 | 80 |
| 5 | do | 100 | 100 | 100 |
| 6 | do | 100 | 100 | 100 |
| 7 | do | 100 | 100 | 100 |
| 8 | do | 100 | 100 | 100 |
| 9 | do | 100 | 100 | 100 |

[1] 4.8 grams of vinyl phosphate compound dissolved in acetone to 100 cc.

Following Table 3 illustrates field tests for systemic pesticide activity of some of the vinyl phosphate compounds of this invention. The tests were run by applying the indicated formulation to furrows just prior to seeding with horticultural bean plants. The plants were infested with the indicated pest, and observations were made 5 days later (in the case of mites) and 2 days later (in the case of Mexican bean beetle adults).

Table 3

| Vinyl Phosphate Compound | Formulation (parts by volume) | Mites (percent kill) | Mexican Bean Beetle Adults (percent kill) |
|---|---|---|---|
| 1 | 1 part vinyl phosphate composition [1] per 39 parts water. | 96.2 | 100 |
| 2 | ----do---- | 100 | |
| 3 | ----do---- | 100 | 80 |

[1] 4.8 grams of vinyl phosphate compound dissolved in acetone to 100 cc.

From the foregoing, it is apparent that we have discovered a series of novel and valuable compounds possessing outstanding value as insecticides and miticides.

Since various changes and modifications may be made in the invention without departing from the spirit thereof, it is intended that all matter contained in the above description shall be interpreted as illustrative and not in a limiting sense.

We claim:

1. A vinyl phosphate compound selected from the group of compounds having the following general formulas:

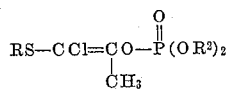

and

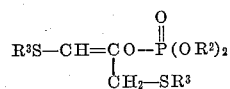

in which R is a member of the group consisting of lower alkyl and monochloroalkyl radicals, and $R^2$ and $R^3$ are lower alkyl radicals.

2. A vinyl phosphate compound having the following general formula:

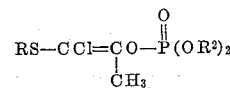

in which R is a member of the group consisting of alkyl and monochloroalkyl radicals containing from one to four carbon atoms, and $R^2$ is an alkyl radical containing from one to four carbon atoms.

3. A vinyl phosphate compound having the following general formula:

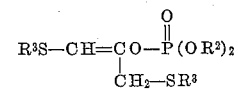

in which $R^2$ and $R^3$ are alkyl radicals containing from one to four carbon atoms.

4. The vinyl phosphate compound having the following formula:

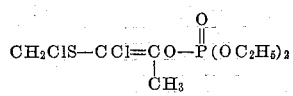

5. The vinyl phosphate compound having the following formula:

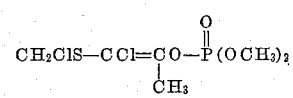

6. The method of preparing a vinyl phosphate compound having the following general formula:

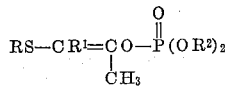

in which R is a member of the group consisting of lower alkyl and monochloroalkyl radicals, $R^1$ is a member of the group consisting of hydrogen and chlorine, and $R^2$ is a lower alkyl radical, which comprises reacting an alkylmercaptoacetone having the following general formula:

$$R^3S-CH_2-CO-CH_3$$

in which $R^3$ is a lower alkyl radical, with a chlorinating agent, thereby forming a chlorinated mercaptoacetone compound, and then reacting said chlorinated mercaptoacetone compound with a lower trialkyl phosphite.

7. The method of preparing a vinyl phosphate compound having the following general formula:

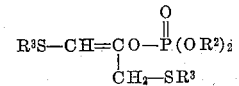

in which $R^2$ and $R^3$ are lower alkyl radicals, which comprises reacting a 1,3-di(alkylmercapto)acetone having the following formula:

$$R^3S-CH_2-CO-CH_2SR^3$$

in which $R^3$ is a lower alkyl radical, with a chlorinating agent, thereby forming a chlorinated mercaptoacetone compound, and then reacting said chlorinated mercaptoacetone compound with a lower trialkyl phosphite.

8. Pesticidal compositions comprising a vinyl phosphate compound selected from the group of compounds having the following general formulas:

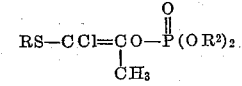

and

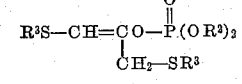

in which R is a member of the group consisting of lower alkyl and monochloroalkyl radicals, and $R^2$ and $R^3$ are lower alkyl radicals, together with a carrier therefor.

9. Pesticidal compositions comprising a vinyl phosphate compound having the following general formula:

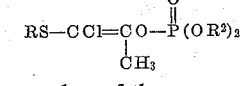

in which R is a member of the group consisting of alkyl and monochloroalkyl radicals containing from one to four carbon atoms, and $R^2$ is an alkyl radical containing from one to four carbon atoms, together with a carrier therefor.

10. Pesticidal compositions comprising a vinyl phosphate compound having the following general formula:

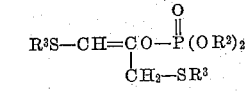

in which $R^2$ and $R^3$ are alkyl radicals containing from one to four carbon atoms, together with a carrier therefor.

11. Pesticidal compositions comprising the vinyl phosphate compound having the following formula:

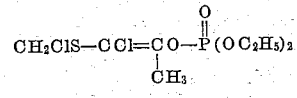

together with a carrier therefor.

12. Pesticidal compositions comprising the vinyl phosphate compound having the following formula:

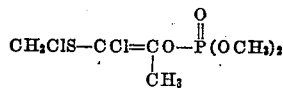

together with a carrier therefor.

13. The process of combatting pests which comprises exposing said pests to the action of a pest-controlling composition comprising a vinyl phosphate compound selected from the group of compounds having the following general formulas:

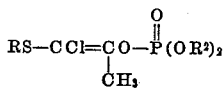

and

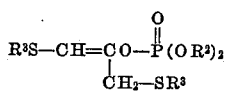

in which R is a member of the group consisting of lower alkyl and monochloroalkyl radicals, and $R^2$ and $R^3$ are lower alkyl radicals.

14. The vinyl phosphate compound having the following formula:

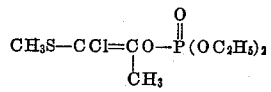

15. Pesticidal compositions comprising the vinyl phosphate compound having the following formula:

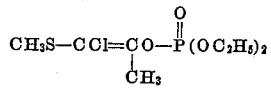

together with a carrier therefor.

References Cited in the file of this patent

UNITED STATES PATENTS

| | | |
|---|---|---|
| 2,116,893 | Heisel | May 10, 1938 |
| 2,864,740 | Diveley | Dec. 16, 1958 |
| 2,864,741 | Diveley | Dec. 16, 1958 |

FOREIGN PATENTS

| | | |
|---|---|---|
| 554,428 | Great Britain | July 2, 1943 |

OTHER REFERENCES

Pudovik et al.: "J. Gen. Chem. U.S.S.R." (English trans.), 26, 1611–4 (1956).